(12) United States Patent
Cross et al.

(10) Patent No.: US 9,089,153 B2
(45) Date of Patent: Jul. 28, 2015

(54) HEAT STABLE, FAT-BASED CONFECTIONS AND METHODS OF MAKING SAME

(75) Inventors: James C. Cross, Kansas City, MO (US); Federico T. Corcoro, Jr., Raytown, MO (US); Anke E. Golde, Rosenthal (DE); Sengngeune Katthaname, Olathe, KS (US)

(73) Assignee: Kerry Group Services International, Ltd., Tralee, County Kerry (IE)

( * ) Notice: Subject to any disclaimer, the term of this patent is extended or adjusted under 35 U.S.C. 154(b) by 642 days.

(21) Appl. No.: 12/195,264

(22) Filed: Aug. 20, 2008

(65) Prior Publication Data

US 2008/0305223 A1 Dec. 11, 2008

Related U.S. Application Data

(62) Division of application No. 11/206,424, filed on Aug. 18, 2005.

(60) Provisional application No. 60/682,912, filed on May 20, 2005.

(51) Int. Cl.
| | |
|---|---|
| A23L 1/00 | (2006.01) |
| A21D 13/00 | (2006.01) |
| A23G 3/54 | (2006.01) |
| A23L 1/164 | (2006.01) |
| A23L 1/18 | (2006.01) |
| A23L 1/36 | (2006.01) |

(52) U.S. Cl.
CPC ............ *A23L 1/0061* (2013.01); *A21D 13/0009* (2013.01); *A23G 3/54* (2013.01); *A23L 1/005* (2013.01); *A23L 1/1641* (2013.01); *A23L 1/1817* (2013.01); *A23L 1/362* (2013.01)

(58) Field of Classification Search
USPC ......................................................... 426/293
See application file for complete search history.

(56) References Cited

U.S. PATENT DOCUMENTS

| | | | |
|---|---|---|---|
| 4,061,790 A | 12/1977 | Cole, Jr. | |
| 4,150,163 A | 4/1979 | Peterson | |
| 4,207,347 A | 6/1980 | D'Atri et al. | |
| 4,567,047 A | 1/1986 | Wilson | |
| 4,594,252 A | 6/1986 | Niemczyk | |
| 4,647,463 A | 3/1987 | Hoover | |
| 4,961,943 A | 10/1990 | Blanthorn et al. | |
| 5,158,800 A | 10/1992 | Bell | |
| 5,344,664 A | 9/1994 | Fitch et al. | |
| 5,397,581 A | 3/1995 | Lerman | |
| 5,474,795 A | 12/1995 | Surber et al. | |
| 5,709,903 A | 1/1998 | St. John et al. | |
| 5,876,774 A | 3/1999 | Nalur et al. | |
| 5,932,275 A | 8/1999 | Nalur | |
| 6,017,571 A | 1/2000 | Cross et al. | |
| 6,060,094 A | 5/2000 | Nalur | |
| 6,139,886 A * | 10/2000 | Green et al. | ..................... 426/96 |
| 6,174,553 B1 | 1/2001 | Cerda et al. | |
| 6,251,456 B1 | 6/2001 | Maul et al. | |
| 6,352,732 B2 | 3/2002 | Lanner et al. | |
| 6,387,422 B1 | 5/2002 | Campbell | |
| 6,555,150 B1 | 4/2003 | Belzowski et al. | |
| 2002/0090421 A1 | 7/2002 | Cross et al. | |

FOREIGN PATENT DOCUMENTS

| | | |
|---|---|---|
| GB | 2341532 | 3/2000 |
| WO | WO 02/11554 | 2/2002 |
| WO | WO 03/047362 | 6/2003 |
| WO | WO 03/092400 | 11/2003 |
| WO | WO 2004/016116 | 2/2004 |
| WO | WO 2005/053418 | 6/2005 |

OTHER PUBLICATIONS

Office Action dated Sep. 3, 2008 in U.S. Appl. No. 11/206,424.
Dand, The international cocoa trade, Copyright 1996 by Woodhead Publishing Ltd., Published 1997 by John Wiley & Sons, Inc.
Merriam-Webster Online, "uniform", http://www.merriam-webster.com/dictionary/uniform (2009).
Office Action dated Feb. 24, 2009 in U.S. Appl. No. 11/206,424.
Office Communication (Interview Summary) dated Apr. 7, 2009 in U.S. Appl. No. 11/206,424.
International Search Report and Written Opinion dated Aug. 18, 2008 in corresponding PCT/US05/34332.
International Preliminary Report on Patentability dated Sep. 16, 2008 in corresponding PCT/US05/34332.

* cited by examiner

*Primary Examiner* — Elizabeth Gwartney
(74) *Attorney, Agent, or Firm* — Hovey Williams LLP

(57) ABSTRACT

New coated food products are provided. The products comprise a center food piece such as a nutmeat or cereal piece, and a coating surrounding the center food piece. The coating can be flavored with flavorings such as cheese, chocolate, or fruit. The coating comprises a substantially homogeneous mixture of a fat-based composition and a particulate material, which results in a stable coating that can tolerate higher temperatures when compared to prior art products while also having 50% or less of the fat content of prior art coatings.

28 Claims, No Drawings

HEAT STABLE, FAT-BASED CONFECTIONS AND METHODS OF MAKING SAME

RELATED APPLICATIONS

This application is a divisional of U.S. patent application Ser. No. 11/206,424, filed Aug. 18, 2005, and entitled HEAT STABLE, FAT-BASED CONFECTIONS AND METHODS OF MAKING SAME, which claims the priority benefit of U.S. Provisional Patent Application No. 60/682,912, filed May 20, 2005, both of which are incorporated by reference herein.

BACKGROUND OF THE INVENTION

1. Field of the Invention

The present invention is broadly concerned with a new coated food product comprising a center food piece coated with a coating comprising a substantially homogeneous mixture of a fat-based, flavored composition and a particulate material.

2. Description of the Prior Art

Coated food products have been prepared in the past for addition to products such as cereal and ice cream, or for eating as a stand-alone product. One example of such an add-in product is a raisin coated with cereal pieces. An example of a stand-alone product is a chocolate-covered malt ball. Prior art products are lacking in that they are not heat-stable. Thus, special care must be taken when transporting and storing these products during warm weather to prevent the product from melting and forming a messy conglomerate rather than remaining as distinct pieces. Also, eating these foods during warm weather can result in a melted mess on the eater's hands and clothes.

Prior art coated products are also relatively high in fat. This high fat content has been necessary due to shortcomings in prior art methods of forming these products. The higher fat content has been necessary to form an organoleptically pleasing product.

There is a need for a lower fat, coated food product that is also heat-stable and tasty.

SUMMARY OF THE INVENTION

The present invention overcomes these problems by broadly novel methods of forming new heat-stable, lower fat, coated food products.

In more detail, the inventive methods comprise the steps of applying (e.g., delivering via a finely dispersed spray) a liquid coating composition and a particulate material to the outer surface of a food piece to form a final coating layer on the food piece. This can be carried out in a conventional panning device. Preferably, the liquid coating composition is applied for a time period of from about 30-90 seconds, and more preferably about 60 seconds, prior to the commencement of particulate material application. After this delay, the particulate material is applied to the food piece, with the particulate material supply source being different from the liquid coating composition source so that the particulate material and liquid coating composition originate from separate streams.

Preferably, at least a portion of the particulate material application step, and more preferably substantially all or all of this application step, is carried out simultaneous to the liquid coating composition application step. Even more preferably, the application steps end at about the same time. The application steps are preferably carried out in an atmosphere having a temperature of from about 60-95° F., and more preferably from about 70-75° F. The application process generally lasts for a time period of from about 10-15 minutes.

After the application of the liquid coating composition and particulate material has been completed (or at least within about 120, or more preferably about 30, seconds of completion), the coated food product is preferably exposed to hot air. This air should have a temperature that is at least about 30° F. higher, more preferably at least about 40° F. higher, and even more preferably from about 60-90° F. higher than the temperature at which the application steps were carried out. This would typically result in hot air temperatures of from about 100-180° F., more preferably from about 120-170° F., and even more preferably from about 130-150° F. The air is preferably delivered to the coated product at a rate of from about 800-2,500 ft³/min., and even more preferably from about 1,000-1,600 ft³/min.

After the hot air delivery step, other dry pieces can be added, if desired. Examples of such additional dry pieces include those selected from the group consisting of dried fruit, vanilla powder, cocoa powder, cookie fines, and mixtures thereof. Regardless of whether additional dry pieces are added, the bed of coated product should have a temperature of from about 70-100° F., and even more preferably from about 88-95° F. after the hot air delivery step.

Referring to the other ingredients used in the inventive process, examples of preferred food pieces include those selected from the group consisting of cereal pieces, nutmeats, bakery pieces, confection pieces (e.g., brownie cubes), fruit pieces, pretzels, and mixtures thereof. Although it will vary depending upon the specific product being formed, the food piece will generally be present in the coated product at a level of from about 30-70% by weight, and even more preferably from about 45-60% by weight, based upon the total weight of the coated product taken as 100% by weight.

The final coating on the food piece is formed from a liquid coating composition and a particulate material as described above. Although it will vary depending upon the specific product being formed, the final coating will generally be present in the coated product at a level of from about 30-70% by weight, and even more preferably from about 45-60% by weight, based upon the total weight of the coated product taken as 100% by weight.

The liquid coating composition, which along with the particulate material forms the final coating, is fat-based and can include a number of flavoring agents. All ingredients included in the liquid coating composition are preferably finely pulverized (e.g., in a 5-roll refining system) so that the average particle size of the material in the coating is less than about 0.0014 inches, and more preferably from about 0.0008-0.0012 inches.

The fat in the liquid coating composition preferably has a melting point of less than about 104° F., more preferably from about 50-100° F., and even more preferably from about 75-95° F. The liquid coating composition will include from about 27-50% by weight fat, more preferably from about 30-40% by weight fat, and even more preferably about 34% by weight fat, based upon the total weight of the liquid coating composition taken as 100% by weight. This process can be used to reduce the fat content of products made by prior art methods by at least about 50%. Suitable fats include fractionated palm kernel oil and other fractionated vegetable oils, hydrogenated soybean oil and other hydrogenated vegetable oils, non-hydrogenated oils (e.g., soybean, canola, and sunflower oils, cocoa butter), and mixtures of the foregoing.

Typical flavorings for use in the liquid coating composition include those selected from the group consisting of sweet and savory flavors (e.g., sour cream and onion), spices, chocolate flavors, cheese flavors, fruit flavors, caramel flavors, yogurt flavors, and mixtures thereof. Other ingredients that can be included in the liquid coating composition include malic acid powder, citric acid powder, lactic acid powder, lecithin, sweetening agents (e.g., sucrose, dextrose, fructose, lactose, maltodextrin, maltitol, sorbitol), milk powder, cocoa powder, and mixtures thereof.

The particulate material used with the inventive methods preferably comprises a homogeneous blend of fine, dry powders. The particulate material is preferably sifted through a 12-mesh screen prior to use to eliminate clumps. Thus, the average particle size of the particulate material is preferably less than about 0.007 inches, more preferably from about 0.001-0.005 inches, and even more preferably from about 0.0025-0.004 inches. Ingredients that can be included in the particulate material include monosaccharides, disaccharides, milk powder, yogurt powder, whey powder, cheese powder, spices, polyols, dried fruit powders, cocoa powder, oat fiber, polydextrose, vitamins, minerals, and mixtures thereof.

The final coating applied to the food piece will comprise a substantially homogenous blend of the liquid coating composition and particulate material. The final coating should comprise from about 30-70% by weight liquid coating composition, preferably from about 40-60% by weight liquid coating composition, and more preferably from about 45-55% by weight liquid coating composition, based upon the total weight of the final coating taken as 100% by weight. The final coating should also comprise from about 30-70%) by weight particulate material, preferably from about 40-60%) by weight particulate material, and more preferably from about 45-55% by weight particulate material, based upon the total weight of the final coating taken as 100% by weight.

Practicing the above invention will result in coated products having several unique properties. For example, the coated product will comprise less than about 10% by weight fat, preferably from about 4-9% by weight fat, and even more preferably about 7.5% by weight fat, based upon the total weight of the coated product taken as 100% by weight. The saturated fat levels will be less than about 10% by weight, preferably from about 1-9% by weight, and even more preferably about 7.5%) by weight, based upon the total weight of the coated product taken as 100% by weight. Furthermore, the trans fat levels will be less than about 1% by weight, and more preferably less than about 0.2% by weight, based upon the total weight of the coated product taken as 100% by weight.

The final coating on the coated product will have a very low total moisture content. More specifically, the total moisture in the final coating will be less than about 0.3%> by weight, preferably less than about 0.2% by weight, and even more preferably less than about 0.1% by weight, based upon the total weight of the final coating taken as 100% by weight. This moisture content is achieved without the need to subject the product to further drying steps.

The final coating on the coated product will also have a much higher melting point than that of prior art products (i.e., the inventive coatings are far more heat-stable). Specifically, the coating of the inventive products will have a melting point of at least about 125° F., preferably at least about 135° F., and even more preferably at least about 150° F. This is a significant advantage over the prior art in that prior art products suffer from the problems of the coating melting from the center piece, the coating smearing on the packaging, the food pieces sticking together, and other problems associated with coatings that melt easily. With the inventive products, the need for extra time and expense involved in special storage and handling conditions is avoided while still providing a product that is organoleptically pleasing.

DETAILED DESCRIPTION OF THE PREFERRED EMBODIMENTS

Examples

The following examples set forth preferred methods in accordance with the invention. It is to be understood, however, that these examples are provided by way of illustration and nothing therein should be taken as a limitation upon the overall scope of the invention.

Example 1

Preparation of Chocolate-Flavored Coating

A chocolate-flavored coating was applied to a dry, roasted whole almond. The percentages by weight of the ingredients in the coated almonds are set forth in Table 1.

TABLE 1

| INGREDIENTS | | % BY WT.[A] |
|---|---|---|
| Whole Roasted Almonds | | 40% |
| Dust Blend #1 | | 30% |
| 12X Powdered Sugar | 70%[B] | |
| Dextrose Powder | 25% | |
| Cocoa Powder | 5% | |
| Chocolate-Flavored Coating | | 29.5% |
| Fractionated Palm Kernel Oil | 35%[C] | |
| Cocoa Powder | 10% | |
| Nonfat Milk Powder | 2% | |
| Lecithin | 0.45% | |
| Flavor | 0.05% | |
| Sucrose | 52.5% | |
| Dust Blend #2 | | 0.5% |
| Cocoa Powder | 100%[D] | |

[A]Based upon the total weight of the coated almond taken as 100% by weight.
[B]Based upon the total weight of Dust Blend #1 taken as 100% by weight.
[C]Based upon the total weight of the chocolate-flavored coating taken as 100% by weight.
[D]Based upon the total weight of Dust Blend #2 taken as 100% by weight.

The chocolate-flavored coating was prepared by using 5-roll, chocolate refining technology to finely grind a blend of sucrose, nonfat milk powder, cocoa powder, fractionated palm kernel oil (35% of total used), and lecithin (50% of total used). A portion (40% of the total used) of the fractionated oil was added to the refined powders, and the mixture was mixed in a warm, jacketed vessel until a thick paste formed. The remaining lecithin was added to the vessel, and the product was standardized to a viscosity of 4,000 centipoise at 120° F. with the remaining fractionated oil. Typically, this viscosity will be from about 1,500 to about 12,000, and more preferably from about 3,000 to about 10,000 centipoise at 120° F. Flavor was added to the system at this point to create a vanilla or chocolate top note.

Using a ribbon blender, a fine (12×), powdered sugar and finely ground dextrose were blended together with cocoa powder to produce Dust Blend #1. Dust Blend #2 included only cocoa powder.

The coating process was carried out by adding the dry roasted whole almonds to a coating pan rotating at a speed of about 20 rpm. This pan should rotated at a speed of from about 5-30 rpm, and more preferably about 20 rpm. Once the almonds were in the pan, the liquid coating was applied through an atomizing spray nozzle. The coating was applied for 1 minute prior to adding Dust Blend #1 to the system. Dust Blend #1 was added continuously and simultaneous to the coating application. The whole process lasted about 15 minutes, and Dust Blend #1 was completely added before all of the liquid coating was sprayed into the system. This process was carried out at a temperature of about 80° F.

After the application of the liquid coating and Dust Blend #1, hot air (about 140° F.) was added to the system at a rate of about 1,000 ft³/min. When the bed of the product was about 95° F. (typically anywhere from about 85-95° F.), the product lost its dusty appearance and began to resemble a fat-coated confection. During the heating step, Dust Blend #2 (cocoa powder) was added to the rotating pan. The powder adhered to the surface of the coated almond, giving a pleasing chocolate hue to the product.

A gum arable solution can also be added after cooling to give the outer surface a shiny appearance, and a small amount of shellac or confectioner's glaze can be added to protect the gum solution.

Example 2

Preparation of Yogurt-Flavored Coating

A yogurt-flavored coating was applied to a cereal-based flake. The percentages by weight of the ingredients in the coated flakes are set forth in Table 2.

TABLE 2

| INGREDIENTS | | % BY WT.[A] |
|---|---|---|
| Cereal Flake | | 40% |
| Dust Blend | | 30% |
| 12X Powdered Sugar | 75%[B] | |
| Dextrose Powder | 22% | |
| Yogurt Powder | 3% | |
| Fat-Based Yogurt Coating | | 30% |
| Fractionated Palm Kernel Oil | 35%[C] | |
| Yogurt Powder | 6% | |
| Nonfat Milk Powder | 5% | |
| Lactic Acid Powder | 0.2% | |
| Lecithin | 0.45% | |
| Flavor | 0.05% | |
| Sucrose | 53.3% | |

[A]Based upon the total weight of the coated cereal flake taken as 100% by weight.
[B]Based upon the total weight of the Dust Blend taken as 100% by weight.
[C]Based upon the total weight of the fat-based yogurt coating taken as 100% by weight.

A yogurt coating was first prepared using 5-roll chocolate refining technology to finely grind a blend of sucrose, yogurt powder, nonfat milk powder, lactic acid powder, fractionated palm kernel oil (35% of the total used), and lecithin (50% of total used). A portion (40% of the total used) of the fractionated oil was added to the refined powders, and the mixture was mixed in a warm, jacketed vessel until a thick paste formed. The remaining lecithin was then added to the vessel, and the product was standardized to a viscosity of 4,000 centipoise at 120° F. with the remaining fractionated oil. Flavor was added to the system at this point to create a vanilla top note.

Using a ribbon blender, a line (12x), powdered sugar, finely ground dextrose, and spray-dried yogurt powder were blended together to produce the Dust Blend. The coating process was commenced by adding the cereal flake to a coating pan rotating at a speed of about 18 rpm. Once the flakes were in the pan, the liquid coating was applied through an atomizing spray nozzle. The coating was applied for 1 minute prior to adding the Dust Blend to the system. The Dust Blend was added continuously and simultaneous to the liquid coating application to the (lakes. The whole process took about 12 minutes to complete, and the Dust Blend was completely added before all the liquid coating was sprayed into the system. The process temperature was about 75° F. After the application of the liquid coating and the Dust Blend, hot air (about 135° F.) was added to the system at a rate of about 1,100 ft³/min. When the bed of the product reached about 95° F., the product lost its dusty appearance and began to resemble a fat coated confection. The process should be completed as rapidly as possible to minimize the breakage of the flakes.

Example 3

Preparation of Chocolate-Flavored Coating

A chocolate-flavored coating was applied to an oat-based cereal ring. The percentages by weight of the ingredients in the coated rings are set forth in Table 3.

TABLE 3

| INGREDIENTS | | % BY WT.[A] |
|---|---|---|
| Oat Cereal Ring | | 50% |
| Dust Blend #1 | | 25% |
| 12X Powdered Sugar | 70%[B] | |
| Dextrose Powder | 25% | |
| Cocoa Powder | 5% | |
| Chocolate-Flavored Coating | | 24.5% |
| Fractionated Palm Kernel Oil | 35%[C] | |
| Cocoa Powder | 10% | |
| Nonfat Milk Powder | 2% | |
| Lecithin | 0.45% | |
| Flavor | 0.05% | |
| Sucrose | 52.5% | |
| Dust Blend #2 | | 0.5% |
| Cocoa Powder | 100%[D] | |

[A]Based upon the total weight of the coated ring taken as 100% by weight.
[B]Based upon the total weight of Dust Blend #1 taken as 100% by weight.
[C]Based upon the total weight of the chocolate-flavored coating taken as 100% by weight.
[D]Based upon the total weight of Dust Blend #2 taken as 100% by weight.

Chocolate refining technology (5-roll refiners) was used to finely grind a blend of sucrose, nonfat milk powder, cocoa powder, fractionated palm kernel oil (35% of the total used), and lecithin (50% of total used). A portion (40% by weight of the total used) of the fractionated oil was added to the refined powders, and the mixture was mixed in a warm jacketed vessel until a thick paste formed. The remaining lecithin was added to the vessel, and the product was standardized to a viscosity of 4,500 centipoise at 120° F. with the remaining fractionated oil. Flavor was added to the system at this point to create a vanilla or chocolate top note.

Using a ribbon blender, a fine (12x), powdered sugar and finely ground dextrose were blended together with cocoa powder to produce the Dust Blend #1. Dust Blend #2 included only cocoa powder.

The coating process was carried out by adding the oat cereal rings to a coating pan rotating at a speed of about 20 rpm. Once the oat rings were in the pan, the liquid coating was applied through an atomizing spray nozzle. After 1 minute of coating application, Dust Blend #1 was added continuously and simultaneous to the liquid coating application to the rings. The entire process lasted about 15 minutes, and the Dust Blend #1 was completely added before all of the liquid coating was sprayed into the system. The application process was carried out at a temperature of about 75° F., after which hot air (135° F.) was added to the system at a rate of about 1,200 ft³/min.

When the bed of the product was about 93° F., it began to lose its dusty appearance and resembled a fat-coated confection. During the heating step, the second dry blend of cocoa powder was added to the rotating pan. The powder adhered to the surface of the coated ring, giving a pleasing chocolate hue to the product.

After cooling of this product, a gum arabic solution can be added to give the outer surface a shiny appearance, and a small amount of shellac or confectioner's glaze can added to protect the gum solution.

Example 4

Preparation of Raspberry Yogurt-Flavored Coating

In this procedure, a raspberry yogurt-flavored coating was applied to an expanded cereal piece. The percentages by weight of the ingredients in the coated pieces are set forth in Table 4.

TABLE 4

| INGREDIENTS | | % BY WT.[A] |
|---|---|---|
| Expanded Cereal Piece | | 50% |
| Dust Blend #1 | | 25% |
| 12X Powdered Sugar | 75%[B] | |
| Dextrose Powder | 25% | |
| Fat-Based Yogurt Coating | | 24.9% |
| Fractionated Palm Kernel Oil | 35%[C] | |
| Yogurt Powder | 2% | |
| Nonfat Milk Powder | 1.5% | |
| Drum-Dried Raspberry Powder | 0.5% | |
| Malic Acid Powder | 0.1% | |
| Citric Acid Powder | 0.2% | |
| Lactic Acid Powder | 0.2% | |
| Lecithin | 0.45% | |
| Flavor | 0.05% | |
| Sucrose | 60% | |
| Dust Blend #2 | | 0.1% |
| Freeze-Dried Raspberry Powder (20 mesh) | 66%[D] | |
| Drum-Dried Raspberry Powder (20 mesh) | 34% | |

[A]Based upon the total weight of the coated piece taken as 100% by weight.
[B]Based upon the total weight of Dust Blend #1 taken as 100% by weight.
[C]Based upon the total weight of the fat-based yogurt coating taken as 100% by weight.
[D]Based upon the total weight of Dust Blend #2 taken as 100% by weight.

The raspberry yogurt coating was first prepared by using 5-roll chocolate refining technology to finely grind a blend of sucrose, yogurt powder, nonfat milk powder, lactic acid powder, citric acid powder, malic acid powder, dried fruit powder, fractionated palm kernel oil (35% of the total used), and lecithin (50% of total used). A portion (40% of the total used) of the fractionated oil was added to the refined powders, and the mixture was mixed in a warm, jacketed vessel until a thick paste formed. The remaining lecithin was added to the vessel, and the product was standardized to a viscosity of 4,000 centipoise at 120° F. with the remaining fractionated oil. Flavor was added to the system at this point to create a berry top note. Refining the dried fruit powder into the coating not only enhances the color, but also provides a nice, natural fruit flavor to the coating.

Using a ribbon blender, a line (12x), powdered sugar and finely ground dextrose were blended together to produce Dust Blend #1. Dust Blend #2 was made by blending various freeze-dried and drum-dried fruit powders together in another ribbon blender.

The coating process was carried out by adding the expanded cereal pieces to a coating pan rotating at a speed of about 20 rpm. Once the cereal pieces were in the pan, the liquid coating was applied through an atomizing spray nozzle. The coating was applied for about 1 minute prior to adding Dust Blend #1 to the system. Dust Blend #1 was added continuously and simultaneous to the liquid coating of the pieces. The whole process took about 10-15 minutes to complete, and Dust Blend #1 was completely added before all of the liquid coating was sprayed into the system. In this example, the application steps were carried out at a temperature of about 75° F.

After the application of the liquid coating and Dust Blend #1, hot air (140° F.) was added to the system at an air flow rate was 1,200 ft³/min. When the bed of the product achieved a temperature of between about 85° F. and about 95° F., the product lost its dusty appearance and began to resemble a fat-coated confection. During and after the heating step, Dust Blend #2 was added to the rotating pan. The powder adhered to the surface of the coated piece, thus giving a pleasing raspberry hue to the product.

Example 5

Preparation of Cheese-Flavored Coating

A cheese-flavored coating was applied to a pretzel piece. The percentages by weight of the ingredients in the coated pretzels are set forth in Table 5.

TABLE 5

| INGREDIENTS | | % BY WT.[A] |
|---|---|---|
| Pretzels | | 40% |
| Dust Blend | | 25% |
| Cheese Powder | 80%[B] | |
| Dextrose Powder | 20% | |
| Cheese-Flavored Coating | | 35% |
| Fractionated Palm Kernel Oil | 35%[C] | |
| Cheese Powder | 40% | |
| Nonfat Milk Powder | 2% | |
| Lecithin | 0.45% | |
| Flavor | 0.05% | |
| Maltodextrin | 22.5% | |

[A]Based upon the total weight of the coated pretzel taken as 100% by weight.
[B]Based upon the total weight of the dry powder blend taken as 100% by weight.
[C]Based upon the total weight of the cheese coating taken as 100% by weight.

The cheese-flavored coating was prepared by using 5-roll chocolate refining technology to finely grind a blend of spray-dried cheese powder, nonfat milk powder, maltodextrin, fractionated palm kernel oil (30% of the total used), and lecithin (50%> of total used). A portion (40% of the total used) of the fractionated oil was added to the refined powders and mixed in a warm, jacketed vessel until a thick paste formed. The remaining lecithin was added to the vessel, and the product was standardized to a viscosity of 5,000 centipoise at 120° F. with the remaining fractionated oil. Flavor was added to the system at this point to create a cheddar cheese top note.

Using a ribbon blender, a line, spray-dried cheese powder and finely ground dextrose were blended together to produce the Dust Blend. The coating process was carried out by adding the pretzel pieces to a coating pan rotating at a speed of about 17 rpm. Once the pretzel pieces were in the pan, the liquid coating was applied through an atomizing spray nozzle. The liquid coating was applied for 1 minute prior to adding the Dust Blend to the system. The Dust Blend was then added continuously and simultaneous to the liquid coating application. The Dust Blend was completely added before all of the liquid coating was sprayed into the system. The coating process was carried out at a temperature of about 75° F. After the application of the coating and the Dust Blend, hot air (135° F.) was added to the system at a rate of about 1,200 ft³/min. When the bed of the product reached a temperature of about 95° F., the product lost its dusty appearance and began to resemble a fat-coated confection.

Example 6

Preparation of a Mixed Berry-Flavored Coating

In this procedure, an unrefined, mixed berry-flavored coating was applied to an expanded cereal piece. The percentages by weight of the ingredients in the coated pieces are set forth in Table 6.

TABLE 6

| INGREDIENTS | | % BY WT.[A] |
|---|---|---|
| Expanded Cereal Piece | | 50% |
| Dust Blend #1 | | 25% |
| 12X Powdered Sugar | 70%[B] | |
| Dextrose Powder | 25% | |
| Drum-Dried Strawberry Powder | 5% | |
| Mixed Berry-Flavored Coating | | 24.5% |
| Fractionated Palm Kernel Oil | 35%[C] | |
| Freeze-Dried Raspberry Powder | 3% | |
| Freeze-Dried Blueberry Powder | 3% | |
| Freeze-Dried Strawberry Powder | 2% | |
| Nonfat Milk Powder | 4% | |
| Lecithin | 0.45% | |
| Flavor | 0.05% | |
| Sucrose | 52.5% | |
| Dust Blend #2 | | 0.5% |
| Drum-Dried Raspberry Powder | 25%[D] | |
| Drum-Dried Strawberry Powder | 65% | |
| Drum-Dried Blueberry Powder | 10% | |

[A]Based upon the total weight of the coated piece taken as 100% by weight.
[B]Based upon the total weight of Dust Blend #1 taken as 100% by weight.
[C]Based upon the total weight of the mixed berry-flavored coating taken as 100% by weight.
[D]Based upon the total weight of Dust Blend #2 taken as 100% by weight.

The berry-flavored coating was prepared by blending finely powdered sucrose, nonfat milk powder, and the freeze-dried berry powders. A portion (50% of the total used) of the fractionated oil was added to the powders, and the mixture was mixed in a warm, jacketed vessel until a thick paste formed. Lecithin was added to the vessel, and the product was standardized to a viscosity of 4,000 centipoise at 120° F. with the remaining fractionated oil. Flavor was added to the system at this point to create a vanilla or berry top note.

Using a ribbon blender, a fine (12×), powdered sugar and finely ground dextrose were blended together with freeze- or drum-dried fruit powder to produce the Dust Blend #1. Dust Blend #2 comprised fruit powders only, and these powders were mixed in a ribbon blender to form Dust Blend #2.

The coating process was carried out by adding the expanded cereal pieces to a coating pan rotating at 20 rpm. Once the cereal pieces were in the pan, the liquid coating was applied through an atomizing spray nozzle. The coating was applied for 1 minute prior to adding Dust Blend #1 to the system. Dust Blend #1 was added continuously and simultaneous to the coating application step. The whole process took about 15 minutes to complete, and Dust Blend #1 was completely added before all the coating was sprayed into the system. This process was carried out at a temperature of about 75° F.

After the application of the coating and the Dust Blend #1, hot air (130° F.) was added to the system at a rate of about 1,300 ft³/min. When the bed of the product was about 94° F., the product lost its dusty appearance and began to resemble a fat-coated confection. During the end of the heating step, Dry Blend #2 (fruit powders) was added to the rotating pan. The powder adhered to the surface of the coated pieces, giving a pleasing berry hue to the product.

A gum arabic solution can be added to the product after cooling to give the outer surface a shiny appearance, and a small amount of shellac or confectioner's glaze can be added to protect the gum solution.

I claim:

1. A method of preparing a coated food product, said method comprising the steps of:
   providing a food piece having an outer surface;
   applying a fat-based liquid coating composition to said outer surface; and
   applying a particulate material to said outer surface, wherein at least a portion of said particulate material applying step is carried out simultaneous to said liquid coating composition applying step so as to form a coating on said food piece, thereby yielding said coated food product, wherein said coating has a melting point of at least about 125° F.; and wherein said coating comprises from about 30-70% by weight of said fat-based liquid coating composition, and from about 30-70% by weight of said particulate material, said coating having a moisture content of less than about 0.3% by weight, said % by weight being based upon the total weight of the coating taken as 100% by weight.

2. The method of claim 1, wherein said liquid coating composition applying step is carried out for a time period of from about 30-90 seconds prior to said particulate material applying step being commenced.

3. The method of claim 1, wherein substantially all of said particulate material applying step is carried out simultaneous to said liquid coating composition applying step.

4. The method of claim 1, further comprising the step of exposing said coated food product to air having a temperature of from about 100-180° F. after said applying steps, and optionally during the last about 120 seconds of said applying steps.

5. The method of claim 1, wherein said liquid coating composition applying step comprises spraying said liquid coating composition onto said outer surface.

6. The method of claim 1, wherein said liquid coating composition applying step and particulate material applying step are carried out in an atmosphere having a temperature of from about 60-95° F.

7. The method of claim 1, wherein said food piece is selected from the group consisting of cereal pieces, nutmeats, bakery pieces, confection pieces, fruit pieces, pretzels, and mixtures thereof.

8. The method of claim 1, wherein said liquid coating composition comprises a flavor selected from the group consisting of chocolate flavors, cheese flavors, fruit flavors, caramel flavors, yogurt flavors, and mixtures thereof.

9. The method of claim 1, wherein the fat in said fat-based liquid coating composition has a melting point of less than about 104° F.

10. The method of claim 1, wherein said liquid coating composition comprises from about 27-50% by weight fat, based upon the total weight of the liquid coating composition taken as 100% by weight.

11. The method of claim 1, wherein said particulate material has an average particle size of less than about 0.007 inches.

12. The method of claim 1, wherein said particulate material comprises an ingredient selected from the group consisting of monosaccharides, disaccharides, milk powder, yogurt powder, whey powder, cheese powder, spices, polyols, dried fruit powders, cocoa powder, oat fiber, polydextrose, vitamins, minerals, and mixtures thereof.

13. The method of claim 1, wherein said coated food product comprises less than about 10% by weight fat, based upon the total weight of the coated food product taken as 100% by weight.

14. The method of claim 1, wherein said liquid coating and particulate material applying steps last for a time period of from about 10-15 minutes.

15. A method of preparing a coated food product, said method comprising the steps of:
  providing a food piece having an outer surface;
  applying a fat-based liquid coating composition to said outer surface;
  applying a particulate material to said outer surface so as to form a coating on said food pieces, thereby yielding said coated food product, wherein said coating has a melting point of at least about 125° F.;
  exposing said coated food product to air having a temperature of from about 100-180° F;
  wherein said coating after said exposing comprises from about 30-70% by weight of said fat-based liquid coating composition, and from about 30-70% by weight of said particulate material, said coating having a moisture content of less than about 0.3% by weight, said % by weight being based upon the total weight of the coating taken as 100% by weight.

16. The method of claim 15, wherein said exposing step is carried out after said applying steps, and optionally during the last about 120 seconds of said applying steps.

17. The method of claim 15, wherein said liquid coating composition applying step is carried out for a time period of from about 30-90 seconds prior to said particulate material applying step being commenced.

18. The method of claim 15, wherein substantially all of said particulate material applying step is carried out simultaneous to said liquid coating composition applying step.

19. The method of claim 15, wherein said liquid coating composition applying step comprises spraying said liquid coating composition onto said outer surface.

20. The method of claim 15, wherein said liquid coating composition applying step and particulate material applying step are carried out in an atmosphere having a temperature of from about 60-95° F.

21. The method of claim 15, wherein said food piece is selected from the group consisting of cereal pieces, nutmeats, bakery pieces, confection pieces, fruit pieces, pretzels, and mixtures thereof.

22. The method of claim 15, wherein said liquid coating composition comprises a flavor selected from the group consisting of chocolate flavors, cheese flavors, fruit flavors, caramel flavors, yogurt flavors, and mixtures thereof.

23. The method of claim 15, wherein the fat in said fat-based liquid coating composition has a melting point of less than about 104° F.

24. The method of claim 15, wherein said liquid coating composition comprises from about 27-50% by weight fat, based upon the total weight of the liquid coating composition taken as 100% by weight.

25. The method of claim 15, wherein said particulate material has an average particle size of less than about 0.007 inches.

26. The method of claim 15, wherein said particulate material comprises an ingredient selected from the group consisting of monosaccharides, disaccharides, milk powder, yogurt powder, whey powder, cheese powder, spices, polyols, dried fruit powders, cocoa powder, and mixtures thereof.

27. The method of claim 15, wherein said coated food product comprises less than about 10% by weight fat, based upon the total weight of the coated food product taken as 100% by weight.

28. The method of claim 15, wherein said liquid coating and particulate material applying steps last for a time period of from about 10-15 minutes.

* * * * *